United States Patent
Tell et al.

(10) Patent No.: US 6,712,493 B2
(45) Date of Patent: Mar. 30, 2004

(54) METHOD AND APPARATUS FOR PRODUCING AN ILLUMINATED ANIMATION EFFECT

(75) Inventors: Robert Tell, Orchard Park, NY (US); David B. Fisher, Orchard Park, NY (US)

(73) Assignees: Tell Design, Orchard Park, NY (US); David Fisher Enterprises, LLC, Orchard Park, NY (US)

(*) Notice: Subject to any disclaimer, the term of this patent is extended or adjusted under 35 U.S.C. 154(b) by 45 days.

(21) Appl. No.: 10/116,318

(22) Filed: Apr. 3, 2002

(65) Prior Publication Data

US 2003/0189820 A1 Oct. 9, 2003

(51) Int. Cl.$^7$ ................................................. F21V 8/00
(52) U.S. Cl. ..................... 362/565; 362/31; 362/570; 362/565; 362/566; 362/237; 362/806; 362/807; 362/808; 362/810
(58) Field of Search .................... 362/31, 570, 565, 362/566, 571, 235, 237, 241, 806, 807, 808, 810

(56) References Cited

U.S. PATENT DOCUMENTS

| | | | |
|---|---|---|---|
| 1,707,965 A | 4/1929 | Scantlebury | |
| 2,486,636 A | 11/1949 | Egle | |
| 2,529,713 A | 11/1950 | Thurston | |
| 5,027,258 A | 6/1991 | Schoniger et al. | 362/31 |
| 5,375,043 A | 12/1994 | Tokunaga | 362/31 |
| 5,572,818 A * | 11/1996 | Churchill | 362/31 |
| 5,576,078 A | 11/1996 | Schatz | 428/13 |
| 5,577,828 A | 11/1996 | Nadel et al. | 362/163 |
| 5,718,498 A | 2/1998 | Pullman | 362/31 |
| 6,293,869 B1 | 9/2001 | Kwan et al. | 460/51 |
| 6,367,957 B1 * | 4/2002 | Hering et al. | 362/511 |

* cited by examiner

Primary Examiner—Laura K. Tso
(74) Attorney, Agent, or Firm—Simpson & Simpson, PLLC

(57) ABSTRACT

An apparatus and a method for producing an animation effect are disclosed. The apparatus comprises a first light reflecting member, a second light reflecting member, a first light source, a second light source, and means to intermittently activate the first and second light sources to produce an animation effect. The first light reflecting member comprises a first surface and a second surface, wherein the light from the first light source enters the first member through the first surface and exits the first member through the second surface. The second light reflecting member comprises a first surface and a second surface, wherein the light from the second source enters the second member through the first surface and exits the second member through the second surface.

47 Claims, 16 Drawing Sheets

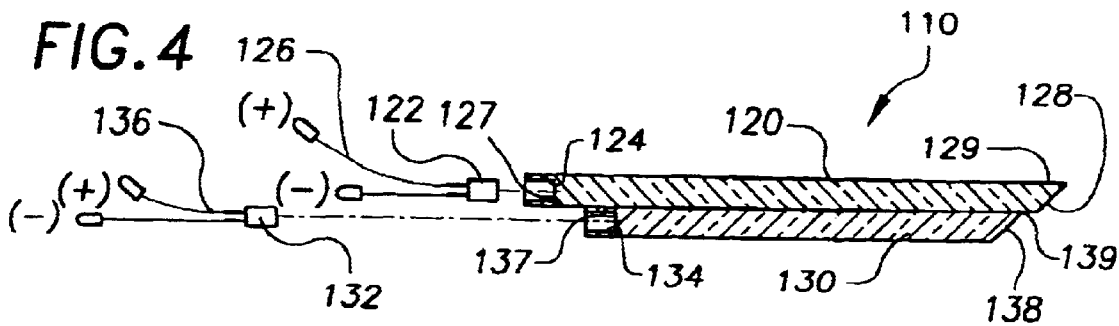
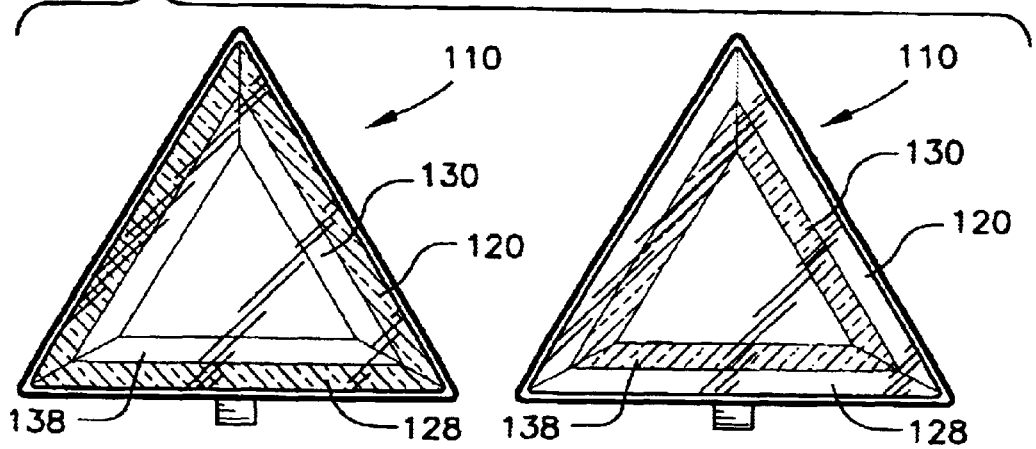
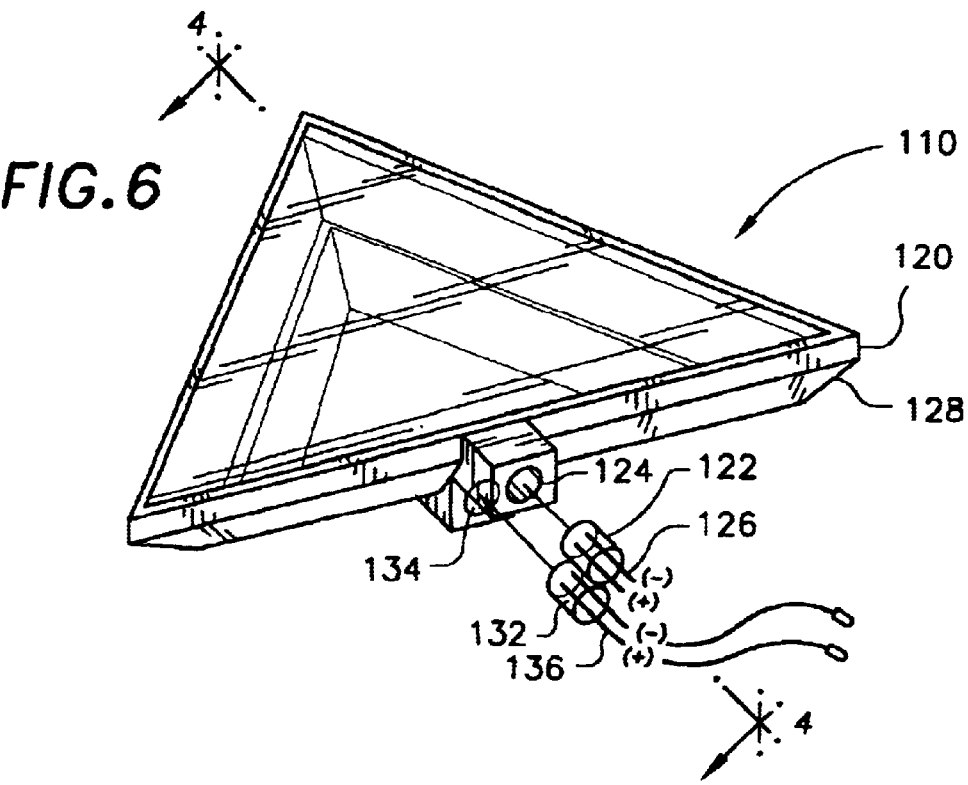

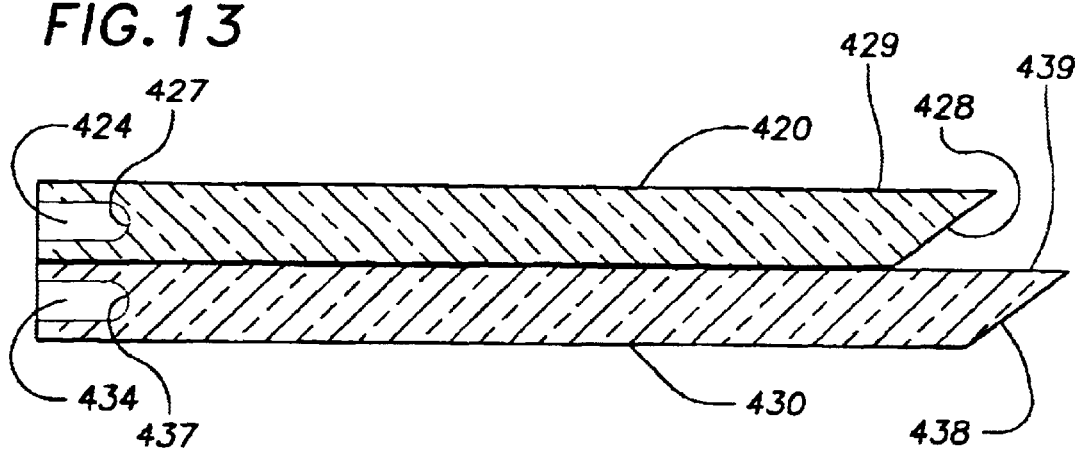
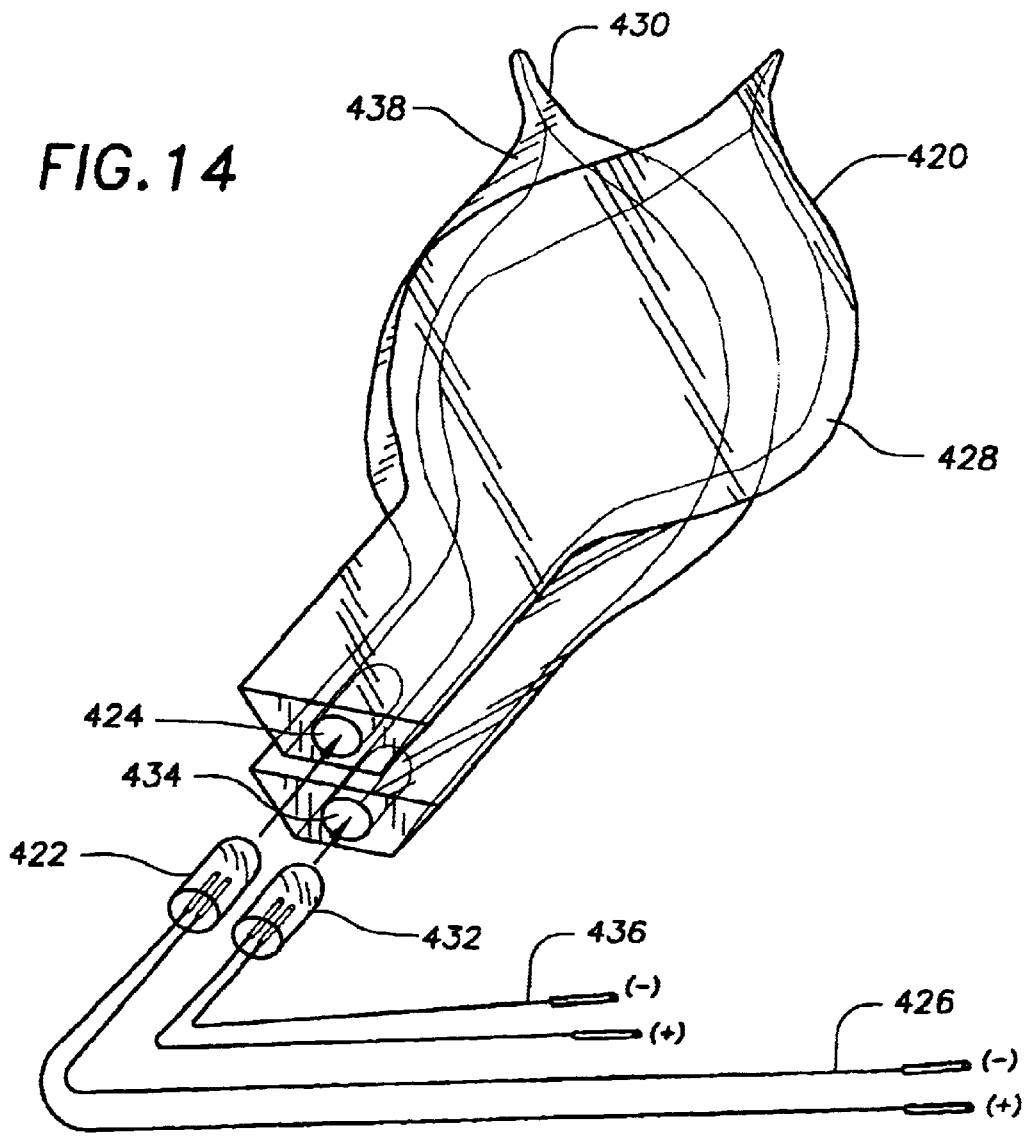

FIG. 18
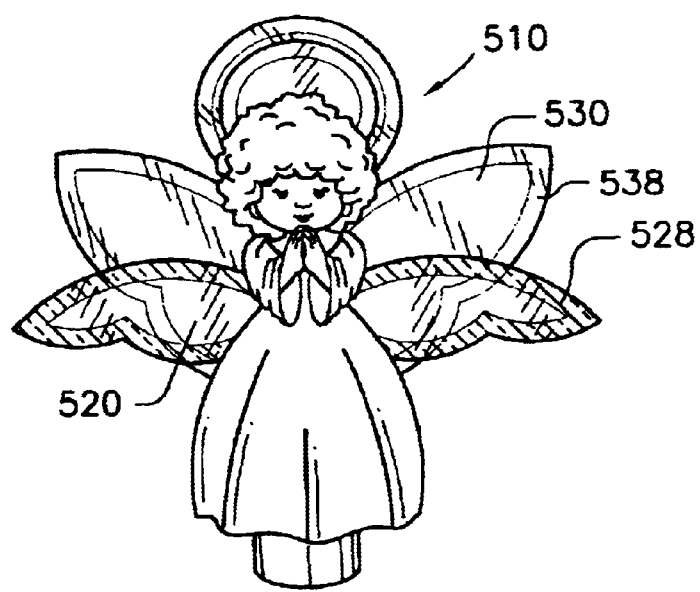
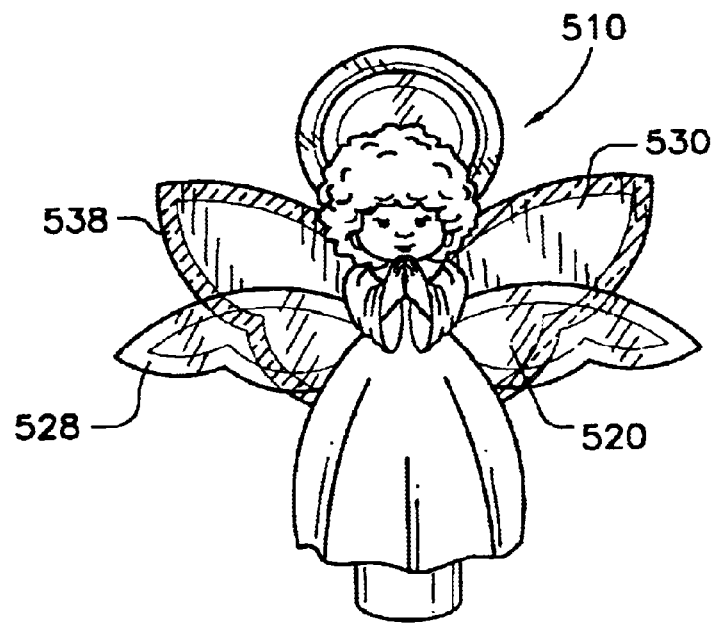

METHOD AND APPARATUS FOR PRODUCING AN ILLUMINATED ANIMATION EFFECT

FIELD OF THE INVENTION

This invention relates generally to illumination and animation. More specifically, it relates to an apparatus that uses light to produce an animation effect. Even more particularly, it relates to a method and apparatus for illuminating at least two members intermittently to produce an animation effect.

BACKGROUND OF THE INVENTION

It is well known that adding illumination to a sign makes the sign more visible and conspicuous. In a similar manner, the addition of illumination to a decoration or a toy makes the decoration or toy more likely to catch the eye and more interesting. There are many examples in the art of the addition of light to an object to make the object more attractive and appealing. One example is disclosed in U.S. Pat. No. 5,577,828 (Nadel et al.). This patent discloses an illuminated assembly for attachment to an item of apparel. The assembly comprises a single transparent or translucent panel member with a design on it, and at least one light attached to the panel member. When a light is turned on, it illuminates the design on the panel member. The light or lights may be flashed if desired. Since there is only one panel member, the result is a single static design that can be illuminated.

An example of an illuminated sign is disclosed in U.S. Pat. No. 5,576,078 (Schatz). A Christmas ornament with a design or message is disclosed. The ornament comprises a single transparent member with an aperture. The aperture allows a single light bulb from a string of Christmas tree lights to be inserted into the member. This illuminates the design or message. Again, since there is only one panel member, the result is a single static design that can be illuminated.

U.S. Pat. No. 2,486,636 (Egle) discloses an ornament with a single member and a single light. The edges of the member are beveled to reflect the light in a direction normal to the surface of the member. There is no disclosure of means to intermittently operate the light.

Clearly, then, there is a longfelt need for a illumination apparatus that is more interesting than a single static design or message, illuminated either continuously or intermittently.

SUMMARY OF THE INVENTION

The present invention broadly comprises a method and apparatus for producing an illuminated animation effect. The apparatus comprises a first light reflecting member, a second light reflecting member, a first light source, a second light source, and means to intermittently activate the first and second light sources to produce an animation effect. The first light reflecting member comprises a first surface and a second surface, wherein the light from the first light source enters the first member through the first surface and exits the first member through the second surface. The second light reflecting member comprises a first surface and a second surface, wherein the light from the second source enters the second member through the first surface and exits the second member through the second surface.

A general object of the present invention is to provide a method and apparatus for producing an illuminated animation effect.

It is another object of the present invention to provide a method and apparatus to make toys and games more attractive and entertaining.

It is yet another object of the present invention to provide an apparatus that is very noticeable to the eye for use in warning signs.

These and other objects, features and advantages of the present invention will become readily apparent to those having ordinary skill in the art upon a reading of the following detailed description of the invention in view of the drawings and claims.

BRIEF DESCRIPTION OF THE DRAWINGS

The nature and mode of operation of the present invention will now be more fully described in the following detailed description of the invention taken with the accompanying drawing figures, in which:

FIG. 4 is a side view of the illuminated warning sign shown in FIG. 3, taken along line 4—4 of FIG. 6;

FIG. 5 is a front view of the warning sign shown in FIG. 3, showing the members being alternately illuminated;

FIG. 6 is a perspective view of the illuminated warning sign shown in FIG. 3, illustrating the power connections to the sign;

FIG. 13 is a side view of the simulated candle flame device, taken generally along line 13—13 in FIG. 12;

FIG. 14 is a perspective view of the simulated candle flame device shown in FIG. 12;

FIG. 18 is a front view of the animated ornamental wings showing the wing members alternately illuminated;

DETAILED DESCRIPTION OF THE PREFERRED EMBODIMENT

It should be appreciated that in the detailed description of the invention that follows that like reference numbers on different drawing views are intended to identify identical structural elements of the invention in the respective views.

Figure 1:
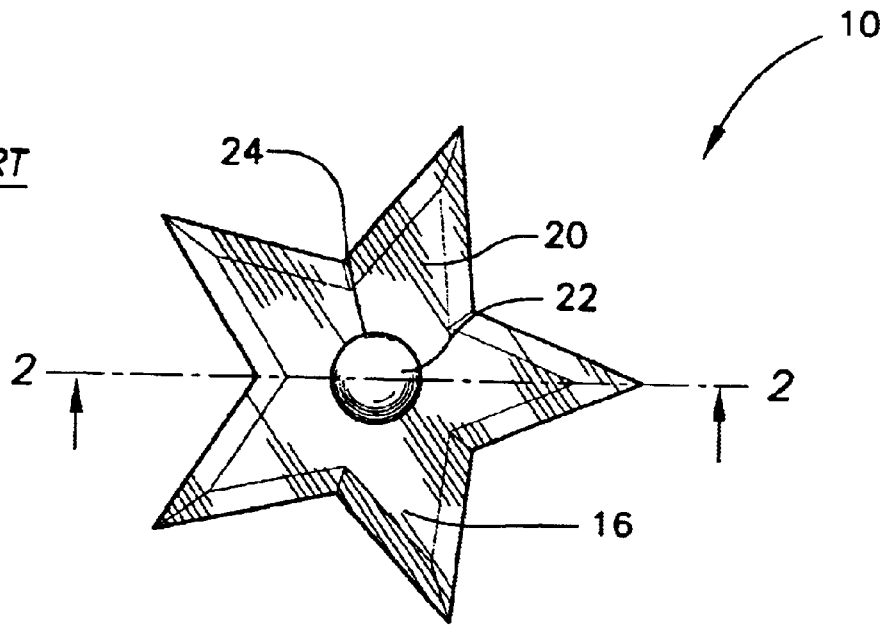
FIG. 1 is a front view of an illuminated decoration.
Figure 2:
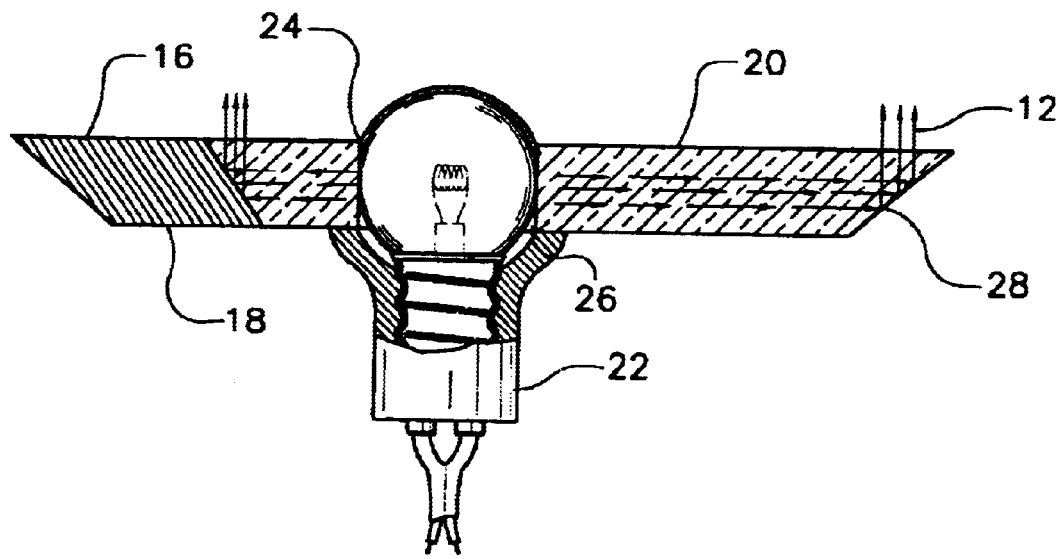
FIG. 2 is a side view of the decoration shown in FIG. 1, taken along line 2—2 of FIG. 1.

The device disclosed in U.S. Pat. No. 2,486,636 (Egle) is shown in FIGS. 1 and 2 and designated 10. The device comprises member 20 and light source 22. Light source 22 is inserted in aperture 24 of member 20. Member 20 comprises front surface 16, rear surface 18, and edge 28. Edge 28 is beveled; meaning that edge 28 is a surface that forms an angle that is not 90 degrees with each of the front and back surfaces around the perimeter of the member. In FIGS. 1 and 2, edge 28 is shown making an angle with front surface 16 of approximately 45 degrees. Edge 28 is shown making an angle with back surface 18 of approximately 135 degrees. When light source 22 is illuminated, light enters member 20 through surface 26, travels through member 20 along arrows 12 reaching beveled edge 28. A portion of the light reflects off edge 28 and passes through front surface 16. It travels perpendicular to front surface 16 towards a viewer facing the decoration.

Figure 26:
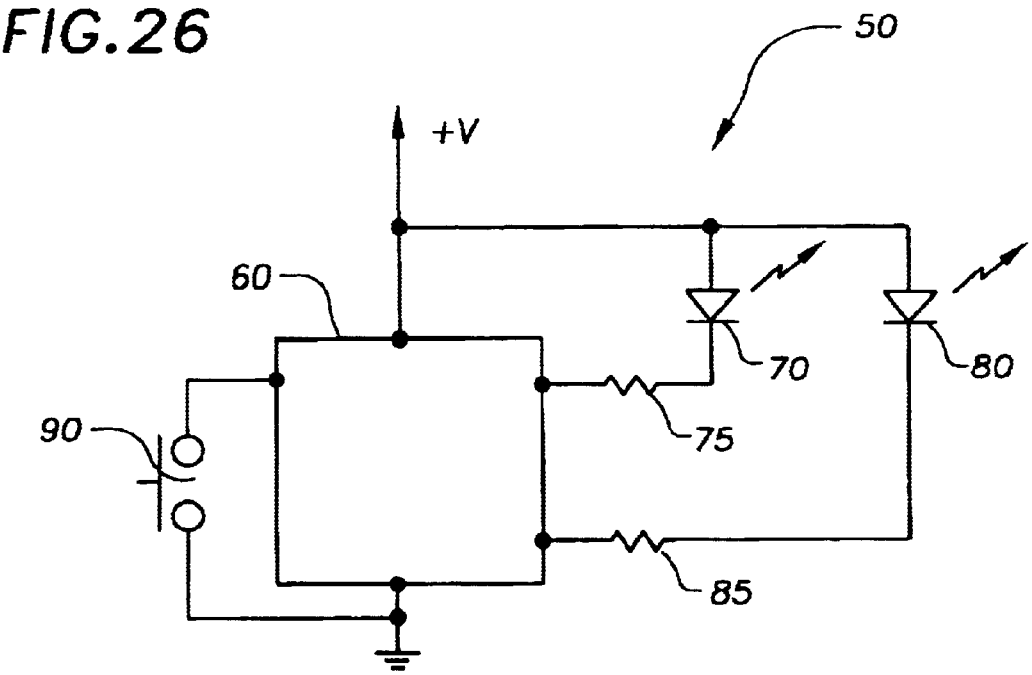
FIG. 26 is a schematic of the electrical control circuit in a preferred embodiment.

A first embodiment of the present invention is shown in FIGS. 3–6 and designated 110. It is a warning sign comprising triangular members 120 and 130, light sources 122 and 132, and leads 126 and 136. Light sources 122 and 132 are inserted in apertures 124 and 134, respectively. Leads 126 and 136 are connected to a power source as shown in FIG. 26, the electrical schematic of the preferred embodiment. When source 122 is illuminated, light enters member 120 through surface 127, travels through member 120 reaching beveled edge 128. A portion of the light reflects off edge 128 and exits through surface 129. When source 132 is illuminated, light enters member 130 through surface 137, travels through member 130 reaching beveled edge 138. A portion of the light reflects off edge 138 and exits through surface 139. In FIGS. 3–6, edge 128 makes approximately a 45 degree angle with exit surface 129, and edge 138 makes approximately a 45 degree angle with exit surface 139. However, it should be readily apparent to one skilled in the art that any angle between 0 and 180 degrees can be used, and these modifications are intended to be within the spirit and scope of the invention as claimed. Thus, the present invention may be practiced with both beveled and non-beveled edges. Further, the angles between the beveled edge and the exit surface may be substantially constant around the perimeter of the member, or the angles may vary around the perimeter of the member.

Figure 3:
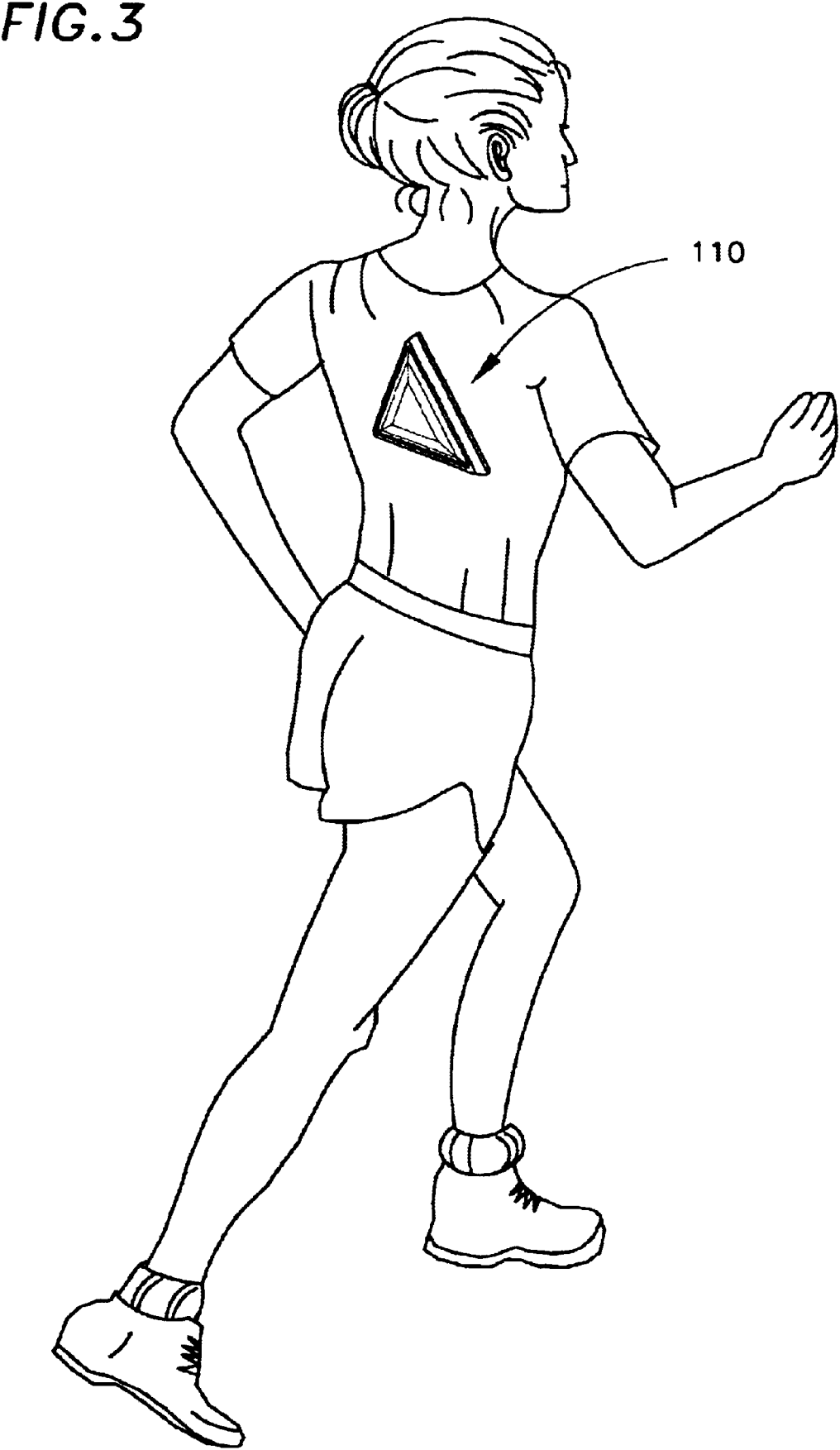
FIG. 3 is a perspective view of a first embodiment of the present invention, an illuminated warning sign, shown worn on the back of a jogger.

Members 120 and 130 are different sizes, stacked such that the members are approximately centered with respect to the larger triangle. In a preferred embodiment, the smaller member is further from the viewer, and the larger member is stacked on the smaller. This ensures that the leads from the smaller member are not routed over the larger member. However, it should be readily apparent to one skilled in the art that the members may be stacked in any order, and these modifications are intended to be within the spirit and scope of the invention as claimed. FIG. 3 shows the warning sign worn by a pedestrian. FIG. 4 is a side view of the sign. FIG. 5 is a front view of the sign showing the members being alternately illuminated. FIG. 6 is a perspective view of the members with the light sources and leads. Members 120 and 130 are alternately illuminated by sources 122 and 132, respectively, to produce the effect of a triangle increasing or decreasing in size. In FIGS. 3–6, two members are shown, but it should be readily apparent to one skilled in the art that three or more members can be used to produce an animation effect, and these modifications are intended to be within the spirit and scope of the invention as claimed.

Figure 7:
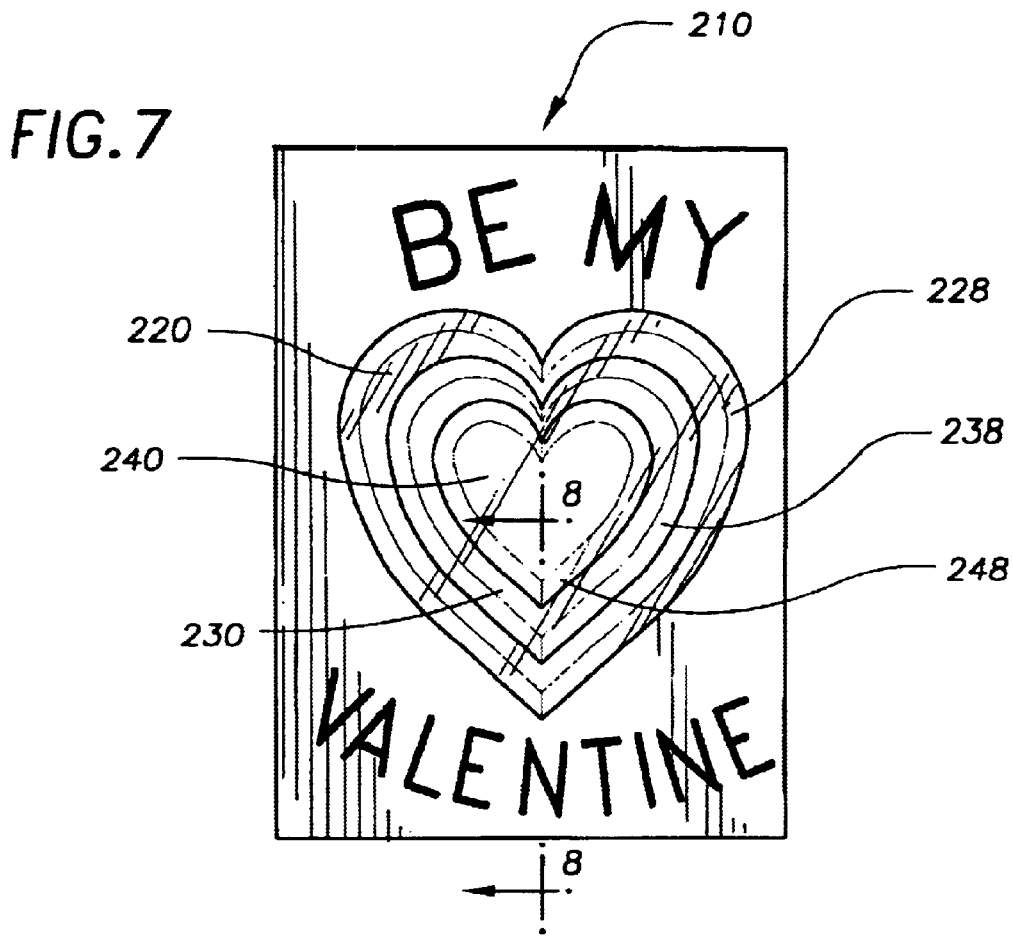
FIG. 7 is a front view of a second embodiment of the present invention, a simulated animated heart installed inside a greeting card, where the card is shown in a closed position.
Figure 8:
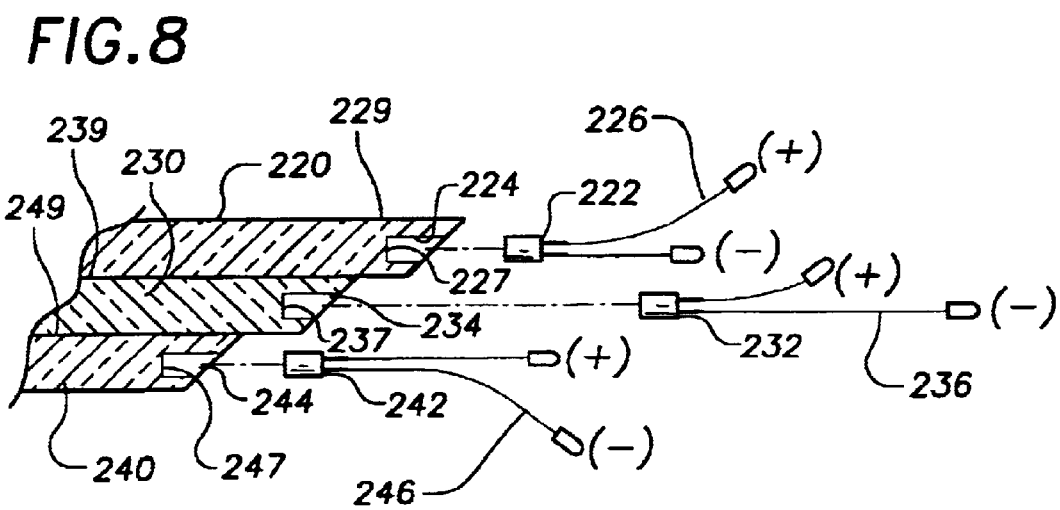
FIG. 8 is a fragmentary side view of the simulated animated heart shown in FIG. 7, taken along line 8—8 of FIG. 7.

A second embodiment of the present invention is shown in FIGS. 7 and 8 and designated 210. It is an ornamental heart comprising heart-shaped members 220, 230, and 240, light sources 222, 232, and 242, and leads 226, 236, and 246. Light sources 222, 232, and 242 are inserted in apertures 224, 234, and 244, respectively. Leads 226, 236, and 246 are connected to a power source as shown in FIG. 26, the electrical schematic of the preferred embodiment. When source 222 is illuminated, light enters member 220 through surface 227, travels through member 220 reaching beveled edge 228. A portion of the light reflects off edge 228 and exits through surface 229. When source 232 is illuminated, light enters member 230 through surface 237, travels through member 230 reaching beveled edge 238. A portion of the light reflects off edge 238 and exits through surface 239. When source 242 is illuminated, light enters member 240 through surface 247, travels through member 240 reaching beveled edge 248. A portion of the light reflects off edge 248 and exits through surface 249. In FIGS. 7 and 8, edge 228 makes approximately a 45 degree angle with exit surface 229, edge 238 makes approximately a 45 degree angle with exit surface 239, and edge 248 makes approximately a 45 degree angle with exit surface 249. However, it should be readily apparent to one skilled in the art that any angle between 0 and 180 degrees can be used, and these modifications are intended to be within the spirit and scope of the invention as claimed. Thus, the present invention may be practiced with both beveled and non-beveled edges. Further, the angles between the beveled edge and the exit surface may be substantially constant around the perimeter of the member, or the angles may vary around the perimeter of the member.

Members 220, 230, and 240 are different sizes, stacked such that the members are approximately centered with respect to the largest heart. In a preferred embodiment, the smallest heart is furthest from the viewer, and the next larger heart in turn is stacked on the smallest. This ensures that the leads from a smaller member are not routed over any of the larger members. However, it should be readily apparent to one skilled in the art that the members may be stacked in any order, and these modifications are intended to be within the spirit and scope of the invention as claimed. FIG. 7 is a front view of the heart installed in a card, with the card closed. FIG. 8 is a side view of the heart members, light sources, and leads. In a preferred embodiment, members 220, 230, and 240 are intermittently illuminated by sources 222, 232, and 242, respectively, to produce the effect of an ornamental heart beating. However, it should be readily apparent to one skilled in the art that other animation effects can be created by intermittently lighting the members, and these modifications are within the spirit and scope of the invention as claimed. In FIGS. 7 and 8, three members are shown, but it should be readily apparent to one skilled in the art that two, four, or more than four members can be used to produce an animation effect, and these modifications are intended to be within the spirit and scope of the invention as claimed.

Figure 9:
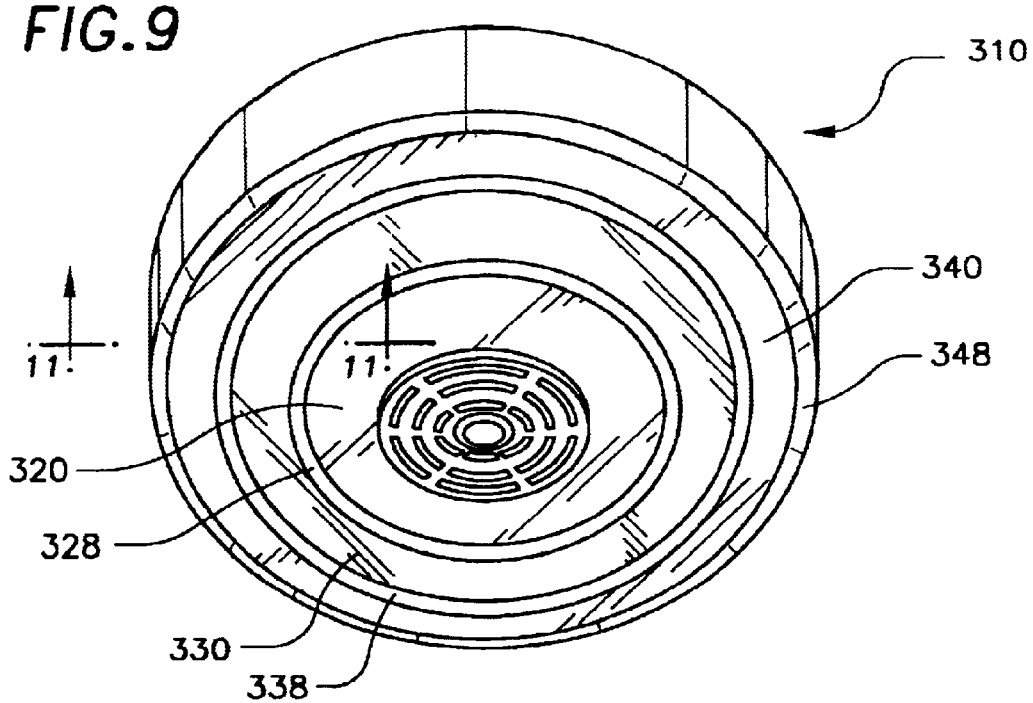
FIG. 9 is a perspective view of a third embodiment of the present invention, a battery indicator in a smoke alarm.
Figure 10:
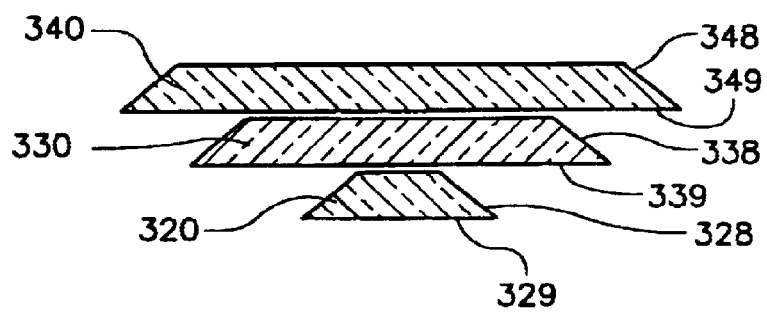
FIG. 10 is a side view of the battery indicator members taken along line 11—11 of FIG. 9.
Figure 11:
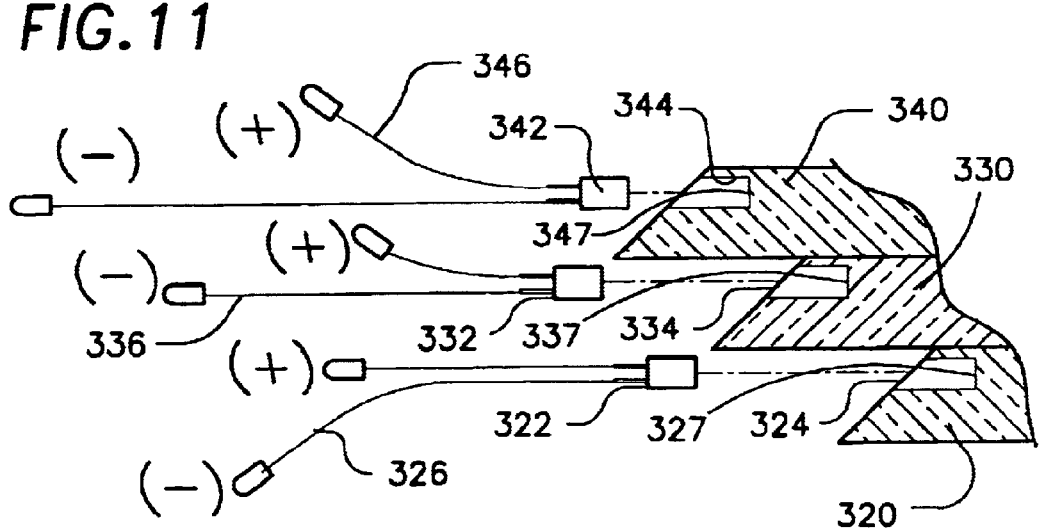
FIG. 11 is a fragmentary side view of the battery indicator taken along line 11—11 of FIG. 9.

A third embodiment of the present invention is shown in FIGS. 9–11 and designated 310. It is a smoke detector battery indicator comprising members 320, 330, and 340, light sources 322, 332, and 342, and leads 326, 336, and 346. Light sources 322, 332, and 342 are inserted in apertures 324, 334, and 344, respectively. Leads 326, 336, and 346 are connected to a power source as shown in FIG. 26, the electrical schematic of the preferred embodiment. When source 322 is illuminated, light enters member 320 through surface 327, travels through member 320 reaching beveled edge 328. A portion of the light reflects off edge 328 and exits through surface 329. When source 332 is illuminated, light enters member 330 through surface 337, travels through member 330 reaching beveled edge 338. A portion of the light reflects off edge 338 and exits through surface 339. When source 342 is illuminated, light enters member 340 through surface 347, travels through member 340 reaching beveled edge 348. A portion of the light reflects off edge 348 and exits through surface 349. In FIGS. 9–11, edge 328 makes approximately a 45 degree angle with exit surface 329, edge 338 makes approximately a 45 degree angle with exit surface 339, and edge 348 makes approximately a 45 degree angle with exit surface 349. However, it should be readily apparent to one skilled in the art that any angle between 0 and 180 degrees can be used, and these modifications are intended to be within the spirit and scope of the invention as claimed. Thus, the present invention may be practiced with both beveled and non-beveled edges. Further, the angles between the beveled edge and the exit surface may be substantially constant around the perimeter of the member, or the angles may vary around the perimeter of the member.

Members 320, 330, and 340 are different sizes, stacked such that the members are approximately centered with respect to the smoke detector. FIG. 9 shows a perspective view of the indicator members installed in a smoke detector. FIG. 10 is a side view of the indicator members. FIG. 11 is a side view of the indicator members, light sources, and leads. Members 320, 330, and 340 are intermittently illuminated by sources 322, 332, and 342, respectively, to produce an animation effect. In FIGS. 9–11, three members are shown, but it should be readily apparent to one skilled in the art that two, four, or more than four members can be used to produce an animation effect, and these modifications are intended to be within the spirit and scope of the invention as claimed.

A fourth embodiment of the present invention is shown in FIGS. 12–15 and designated 410. It is a simulated candle flame apparatus comprising flame shaped members 420 and 430, light sources 422 and 432, and leads 426 and 436. Light sources 422 and 432 are inserted in apertures 424 and 434, respectively. Leads 426 and 436 are connected to a power source as shown in FIG. 26, the electrical schematic of the preferred embodiment. When source 422 is illuminated, light enters member 420 through surface 427, travels through member 420 reaching beveled edge 428. A portion of the light reflects off edge 428 and exits through surface 429. When source 432 is illuminated, light enters member 430 through surface 437, travels through member 430 reaching beveled edge 438. A portion of the light reflects off edge 438 and exits through surface 439. In FIGS. 12–15, edge 428 makes approximately a 45 degree angle with exit surface 429, and edge 438 makes approximately a 45 degree angle with exit surface 439. However, it should be readily apparent to one skilled in the art that any angle between 0 and 180 degrees can be used, and these modifications are intended to be within the spirit and scope of the invention as claimed. Thus, the present invention may be practiced with both beveled and non-beveled edges. Further, the angles between the beveled edge and the exit surface may be substantially constant around the perimeter of the member, or the angles may vary around the perimeter of the member.

Figure 12:
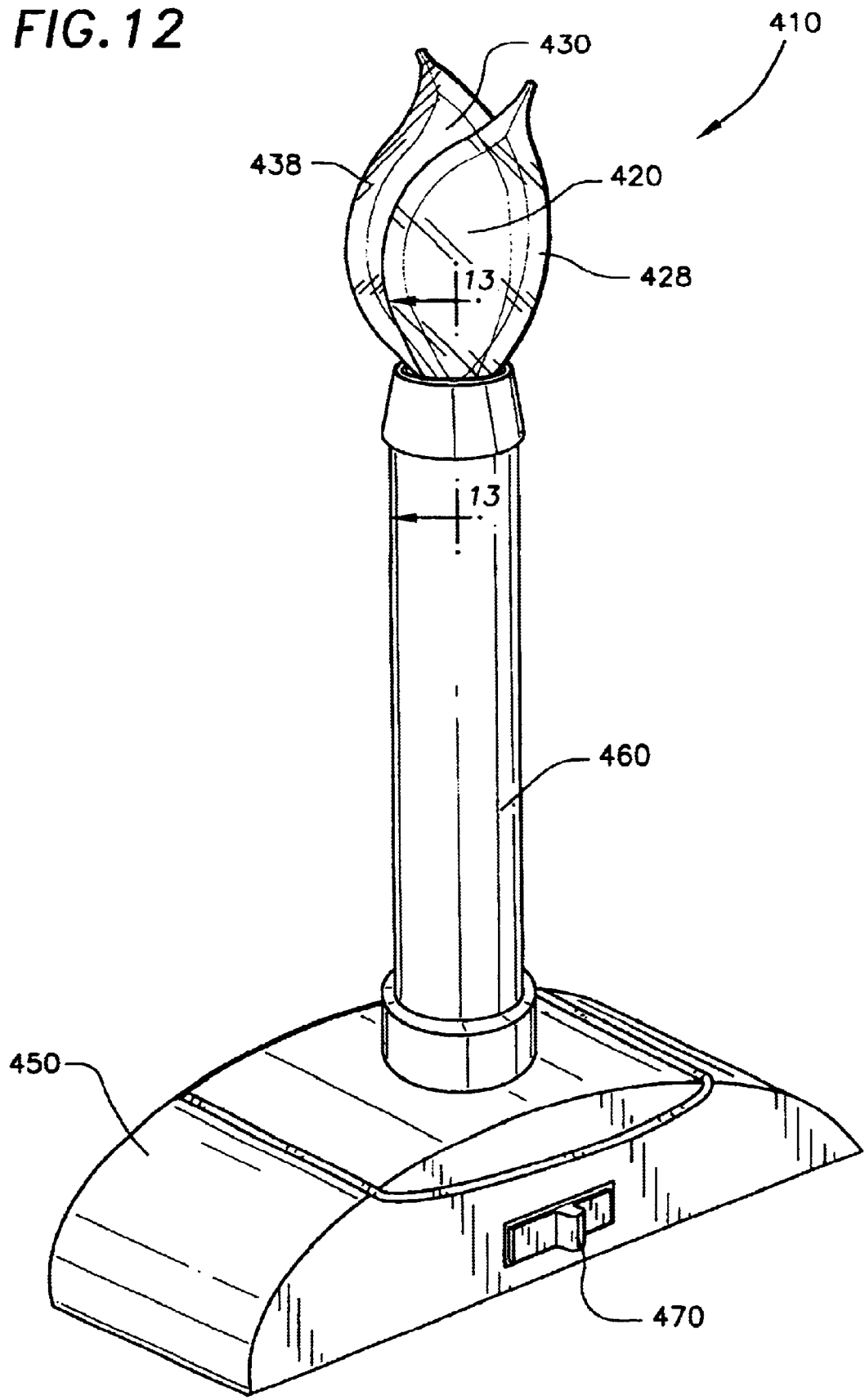
FIG. 12 is a perspective view of a fourth embodiment of the present invention, a simulated candle flame device.
Figure 15:
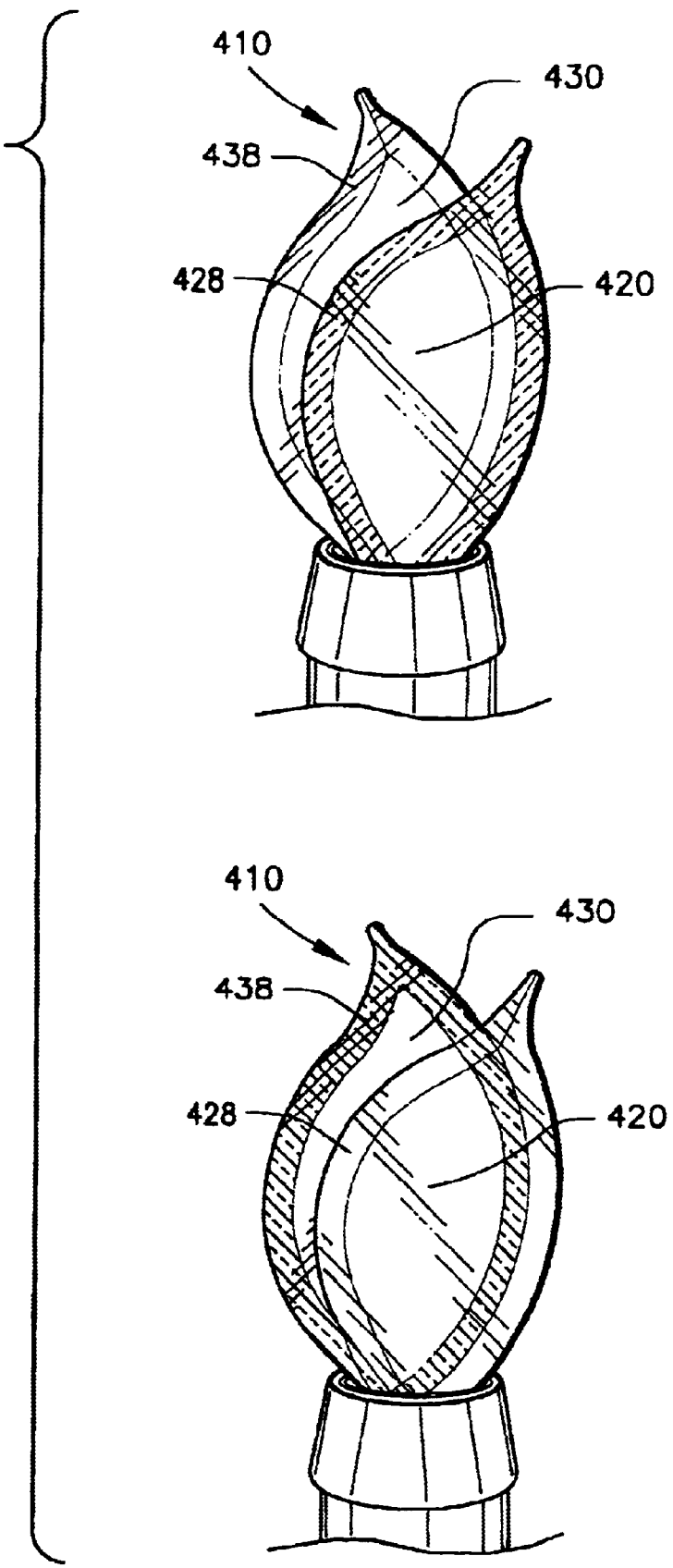
FIG. 15 is a front view of the simulated candle flame device shown in FIG. 12 showing the simulated flame members alternately illuminated.

Members 420 and 430 are offset, and are alternately illuminated by sources 422 and 432, respectively, to produce the effect of the simulated flame flickering. FIG. 12 is a perspective view of a preferred embodiment of the candle flame apparatus, installed in simulated candle 460. Simulated candle 460 is mounted in base 450, with switch 470 to activate the illumination. Switch 470 corresponds to switch 90 shown in FIG. 26. FIG. 13 is a side view of the candle flame members. FIG. 14 is a perspective view of the members with the light sources and leads. FIG. 15 shows the simulated candle flame members being alternately illuminated to produce the animation effect of the simulated flame flickering. In FIGS. 12–15, two members are shown, but it should be readily apparent to one skilled in the art that three or more members can be used to produce an animation effect, and these modifications are intended to be within the spirit and scope of the invention as claimed.

Figure 16:
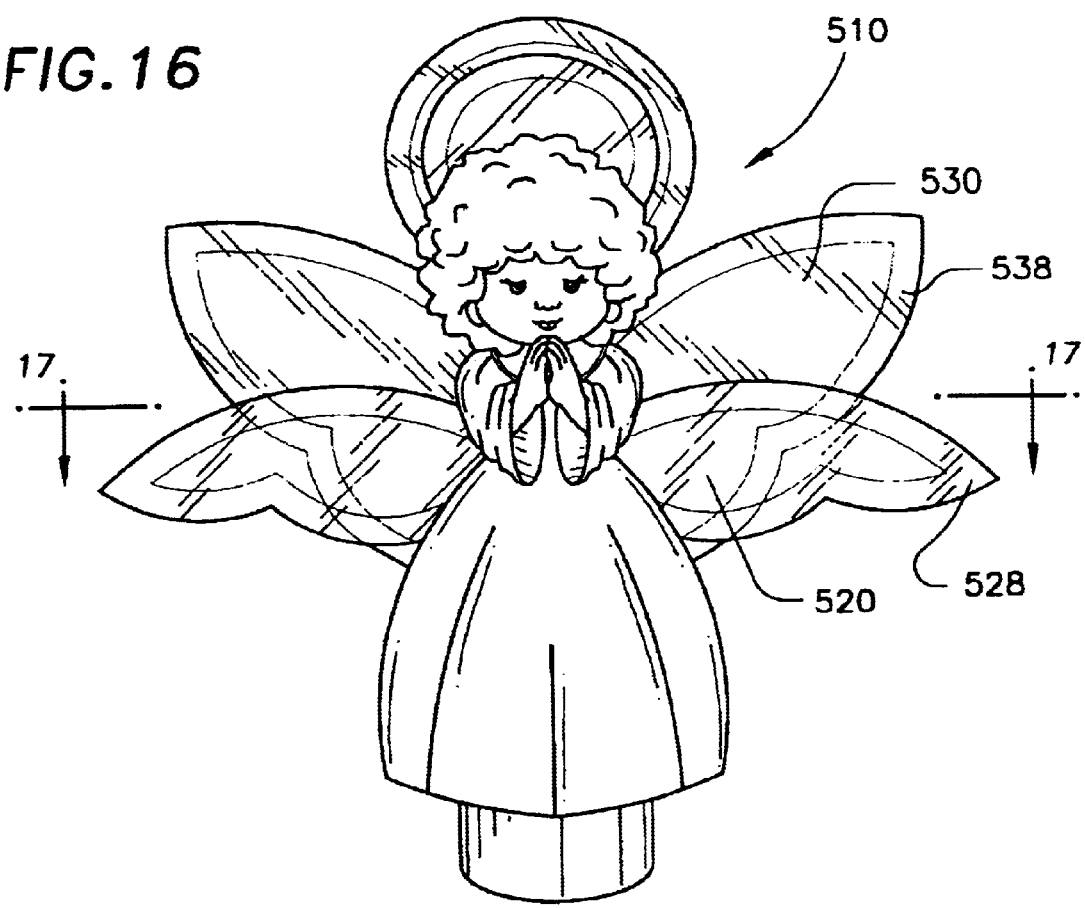
FIG. 16 is a front view of a fifth embodiment of the present invention, a set of animated wings, shown attached to an ornamental angel.
Figure 17:
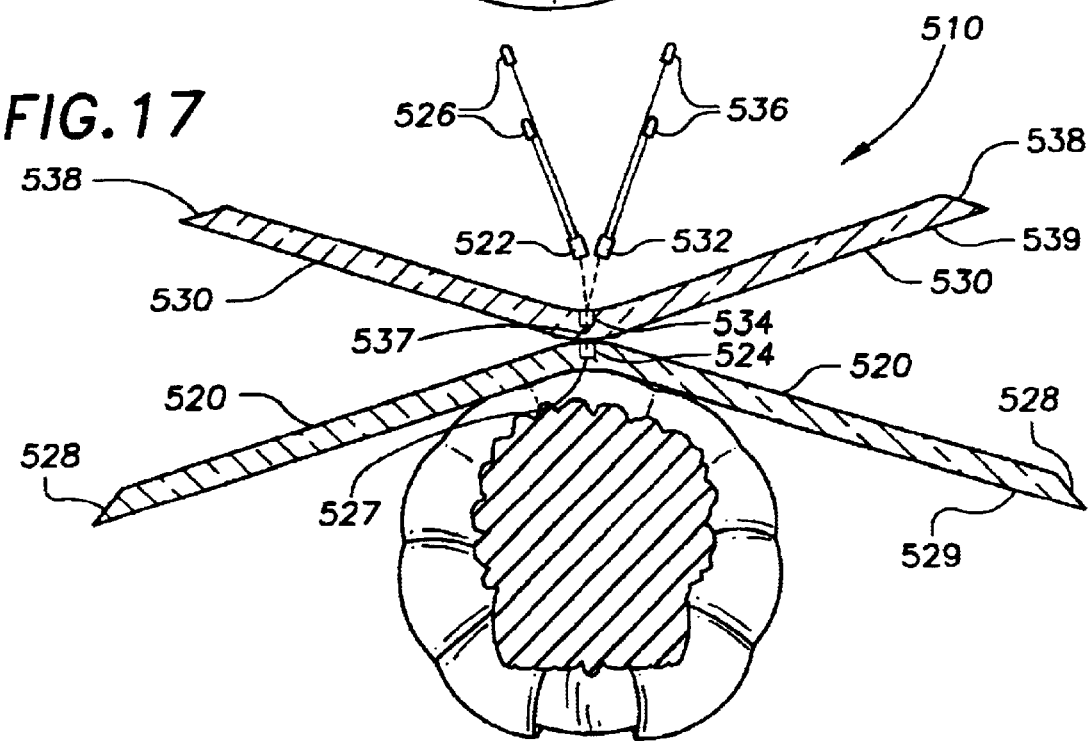
FIG. 17 is a top cross-sectional view of the set of animated wings shown in FIG. 16.

A fifth embodiment of the present invention is shown in FIGS. 16–18 and designated 510. It is an ornamental set of wings comprising wing shaped members 520 and 530, light sources 522 and 532, and leads 526 and 536. Light sources 522 and 532 are inserted in apertures 524 and 534, respectively. Leads 526 and 536 are connected to a power source as shown in FIG. 26, the electrical schematic of the preferred embodiment. When source 522 is illuminated, light enters member 520 through surface 527, travels through member 520 reaching beveled edge 528. A portion of the light reflects off edge 528 and exits through surface 529. When source 532 is illuminated, light enters member 530 through surface 537, travels through member 530 reaching beveled edge 538. A portion of the light reflects off edge 538 and exits through surface 539. In FIGS. 16–18, edge 528 makes approximately a 45 degree angle with exit surface 529, edge 538 makes approximately a 45 degree angle with exit surface 539, and edge 548 makes approximately a 45 degree angle with exit surface 549. However, it should be readily apparent to one skilled in the art that any angle between 0 and 180 degrees can be used, and these modifications are intended to be within the spirit and scope of the invention as claimed. Thus, the present invention may be practiced with both beveled and non-beveled edges. Further, the angles between the beveled edge and the exit surface may be substantially constant around the perimeter of the member, or the angles may vary around the perimeter of the member.

Members 520 and 530 are located in two positions within the range of motion of a set of wings. Thus, as shown in FIGS. 16–18, members 520 and 530, although substantially planar, are not stacked on one another, nor are they parallel to one another. Further, it should be readily apparent to one skilled in the art that ornamental wing members that are not substantially planar can be used, and these modifications are intended to be within the spirit and scope of the invention as claimed. Members 520 and 530 are alternately illuminated by sources 522 and 532, respectively, to produce the effect of the ornamental wings flapping. FIG. 16 is a front view of a preferred embodiment of the ornamental wing apparatus, installed on an ornamental angel. FIG. 17 is a top cross-sectional view of the members with the light sources and leads. FIG. 18 is a front view of the angel ornament, with the wing members being alternately illuminated. In FIGS. 16–18, two members are shown, but it should be readily apparent to one skilled in the art that three or more members can be used to produce an animation effect, and these modifications are intended to be within the spirit and scope of the invention as claimed.

A sixth embodiment of the present invention is shown in FIGS. 19–22 and designated 610. It is an illuminated jaw for a doll comprising upper jaw member 620, lower jaw member 630, light sources 622 and 632, and leads 626 and 636. Light sources 622 and 632 are inserted in apertures 624 and 634, respectively. Leads 626 and 636 are connected to a power source as shown in FIG. 26, the electrical schematic of the preferred embodiment. When source 622 is illuminated, light enters member 620 through surface 627, travels through member 620 reaching beveled edge 628. A portion of the light reflects off edge 628 and exits through surface 629. When source 632 is illuminated, light enters member 630 through surface 637, travels through member 630 reaching beveled edge 638. A portion of the light reflects off edge 638 and exits through surface 639. In FIGS. 19–22, edge 628 makes approximately a 45 degree angle with exit surface 629, and edge 638 makes approximately a 45 degree angle with exit surface 639. However, it should be readily apparent to one skilled in the art that any angle between 0 and 180 degrees can be used, and these modifications are intended to be within the spirit and scope of the invention as claimed. Thus, the present invention may be practiced with both beveled and non-beveled edges. Further, the angles between the beveled edge and the exit surface may be substantially constant around the perimeter of the member, or the angles may vary around the perimeter of the member.

Figure 19:
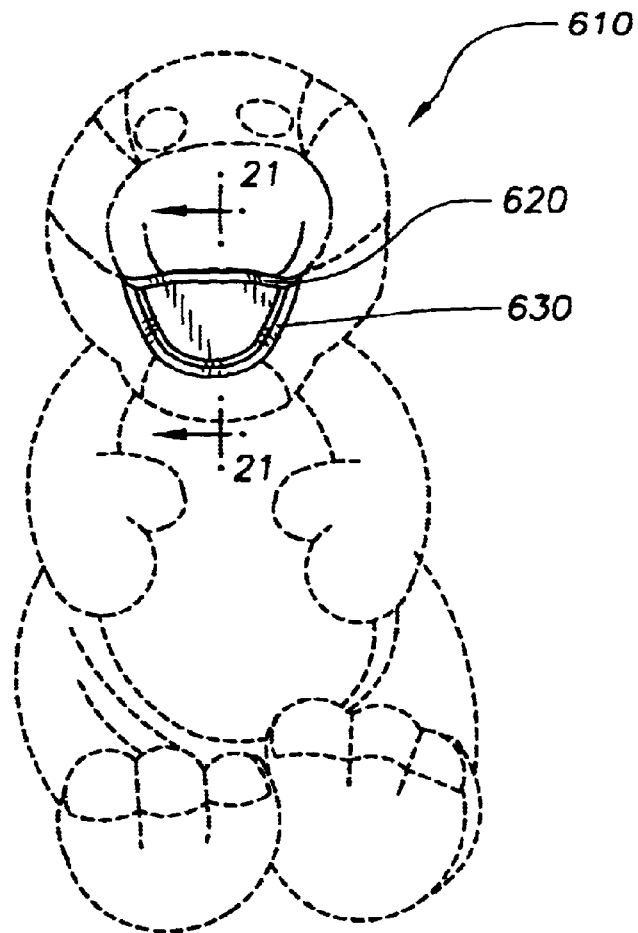
FIG. 19 is a view of a seventh embodiment of the present invention, a plush toy's animated mouth.
Figure 20:
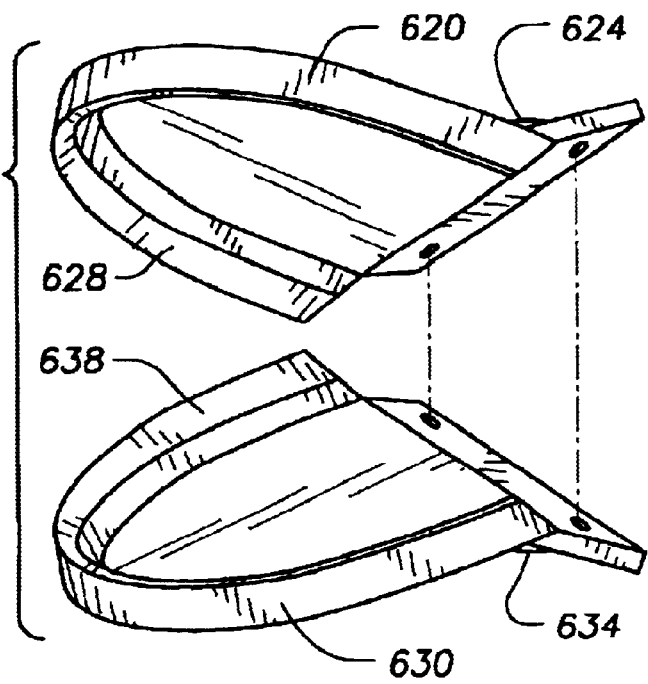
FIG. 20 is an exploded perspective view of the plush toy animated mouth shown in FIG. 19.
Figure 21:
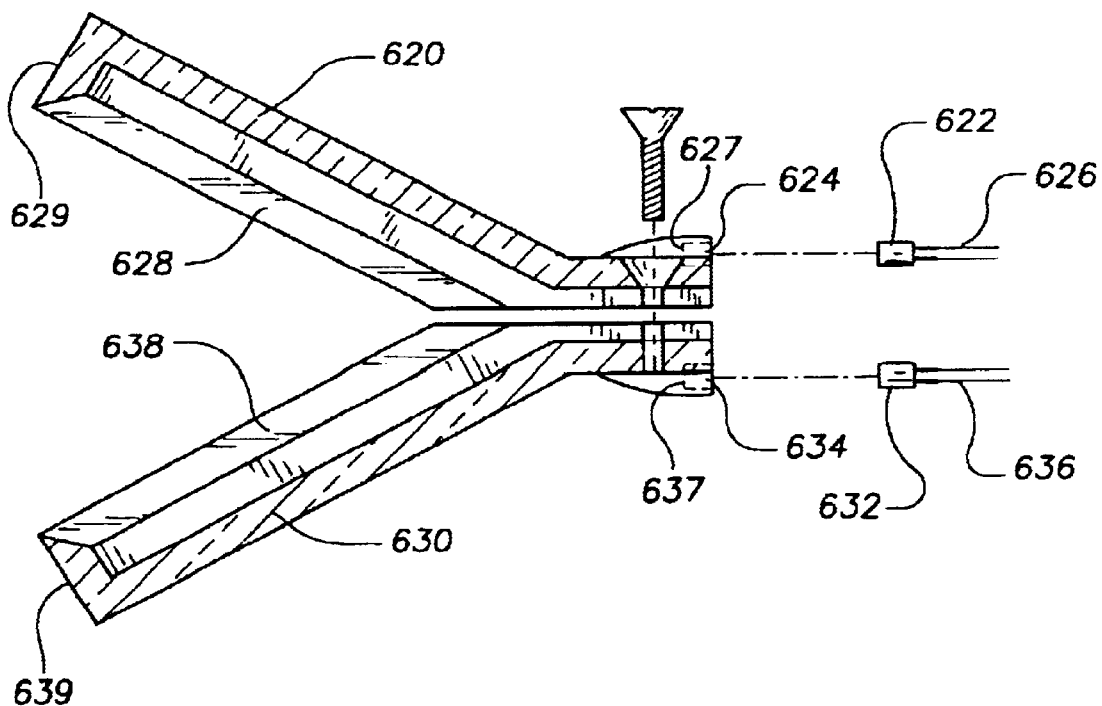
FIG. 21 is a side cross-sectional view of the animated mouth shown in FIG. 19, shown in an assembled view in this drawing.
Figure 22:
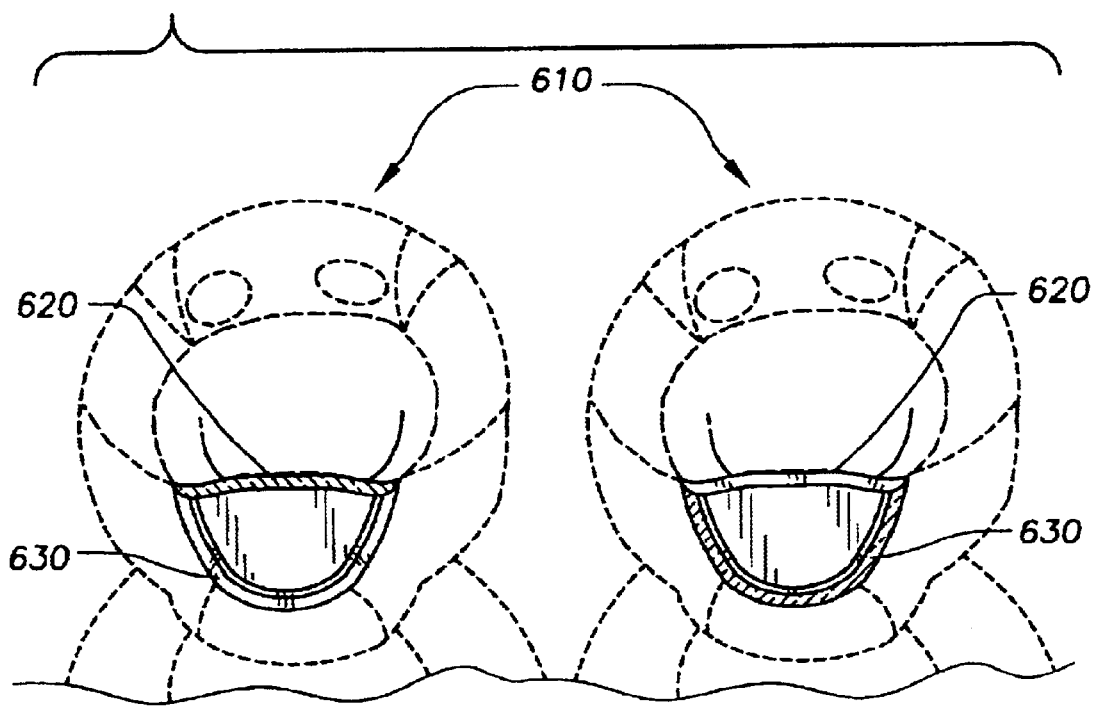
FIG. 22 is a view of the plush toy showing the jaw members alternately illuminated.

FIG. 19 shows the jaws installed in a doll. FIG. 20 is a perspective view of the jaw members. FIG. 21 is a side cross-sectional view of the jaw members, the light sources, and the leads. FIG. 22 shows the jaw members being alternately illuminated. Upper jaw member 620 and lower jaw member 630 are intermittently illuminated by sources 622 and 632, respectively, to produce the effect of the jaw moving.

Figure 23:
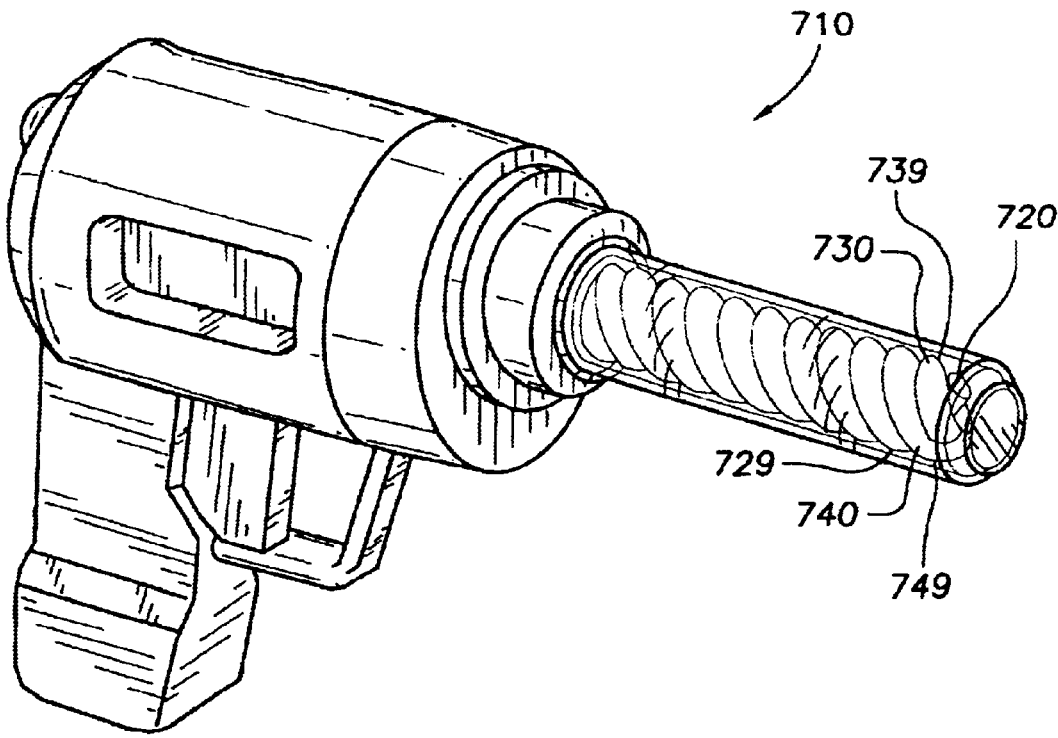
FIG. 23 is a perspective view of a sixth embodiment of the present invention, a simulated drill bit, shown held in a toy drill.
Figure 24:
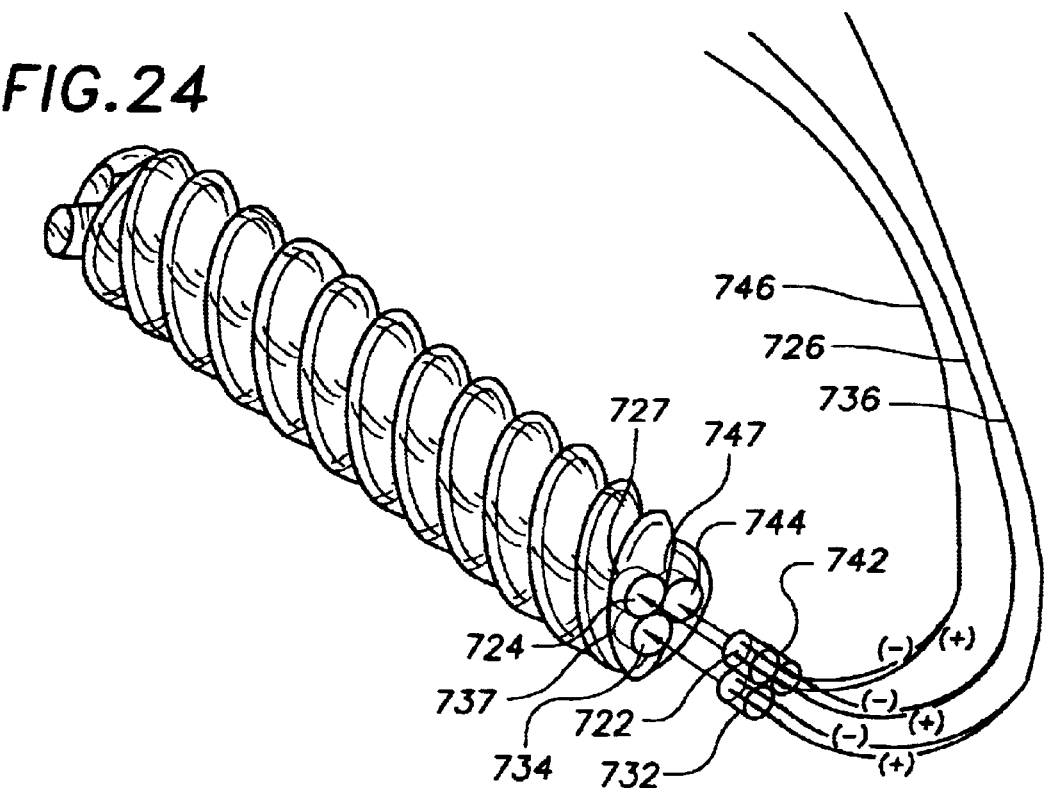
FIG. 24 is a perspective view of the simulated drill bit shown in FIG. 23.
Figure 25:
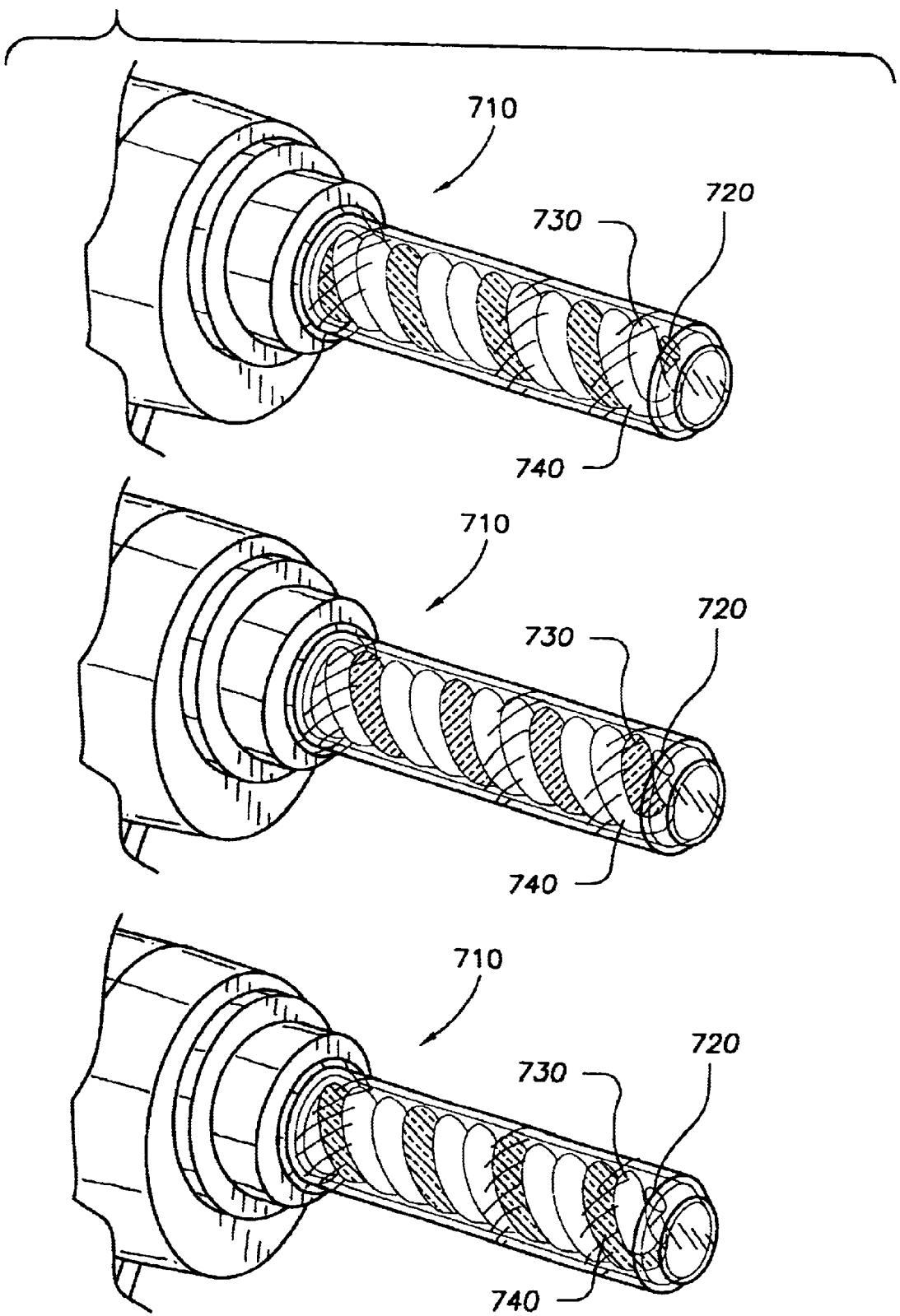
FIG. 25 is a fragmentary perspective view of the drill shown in FIG. 23, showing the drill bit members being alternately illuminated.

A seventh embodiment of the present invention is shown in FIGS. 23–25 and designated 710. It is a drill bit comprising helical members 720, 730, and 740, light sources 722, 732, and 742, and leads 726, 736, and 746. Light sources 722, 732, and 742 are inserted in apertures 724, 734, and 744, respectively. When source 722 is illuminated, light enters member 720 through surface 727, travels through member 720, and a portion of the light exits through surface 729. When source 732 is illuminated, light enters member 730 through surface 737, travels through member 730, and a portion of the light reflects exits through surface 739. When source 742 is illuminated, light enters member 740 through surface 747, travels through member 740, and a portion of the light exits through surface 749. Leads 726, 736, and 746 are connected to a power source as shown in FIG. 26, the electrical schematic of the preferred embodiment. Members 720, 730, and 740 spiral around a central axis. Members 720, 730, and 740 are illuminated sequentially by sources 722, 732, and 742, respectively, to produce the effect of a drill bit turning. FIG. 23 shows a perspective view of the drill bit apparatus installed in a toy drill. FIG. 24 shows the helical members, the light sources, and the leads. FIG. 25 shows the three members being alternately illuminated. In FIGS. 23–25, three members are shown, but it should be readily apparent to one skilled in the art that two, four, or more than four members can be used to produce an animation effect, and these modifications are intended to be within the spirit and scope of the invention as claimed.

Figure 27:
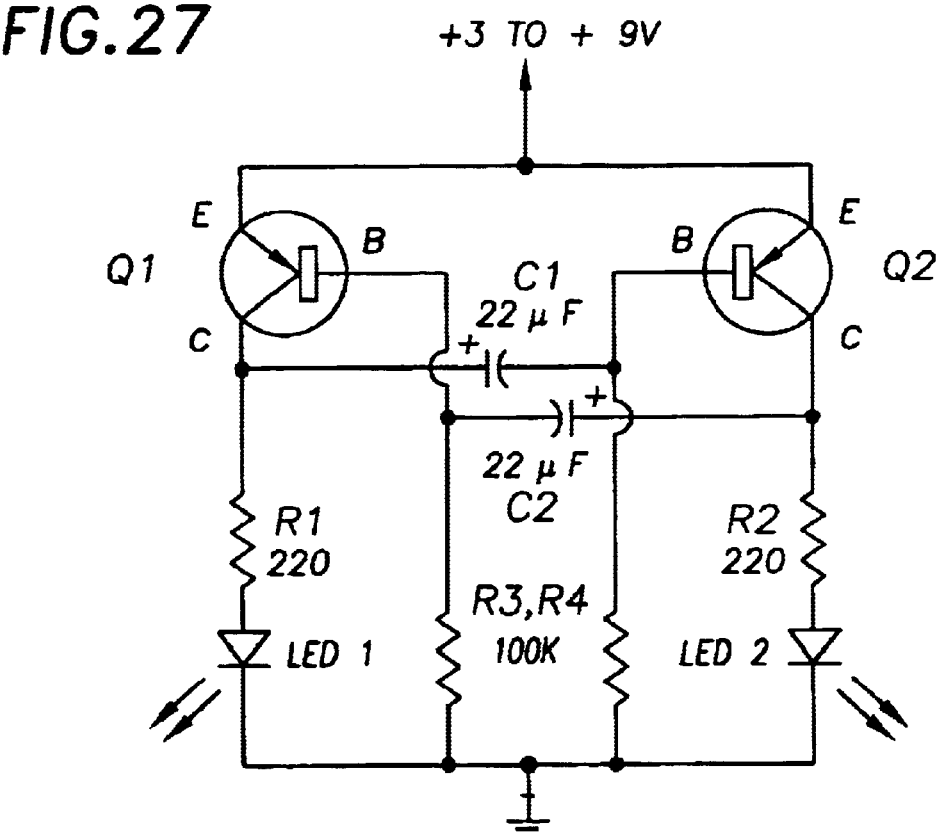
FIG. 27 is a schematic of a circuit that operates two light sources intermittently.

FIG. 26 is a schematic of electronic control circuit 50 used in a preferred embodiment. Micro controller 60 is a preprogrammed integrated chip comprising a circuit operatively arranged to intermittently illuminate light sources 70 and 80. An example of a circuit that operates in this manner is shown in FIG. 27. Light sources 70 and 80 are routed in series with resistors 75 and 85, respectively, between the voltage source and micro controller 60. When switch 90 is closed, micro controller 60 allows current to flow through the light sources in a preprogrammed manner. Light sources 70 and 80 correspond to the light sources shown in FIGS. 3–25. FIGS. 26 and 27 show two light sources being illuminated to create an animation effect. However, additional light sources can be added in a similar manner, and are required for some of the embodiments shown above. As discussed above, a plurality of members, each with at least one light source, may be added to the embodiments disclosed, and these modifications are within the spirit and scope of the invention as claimed.

FIG. 27 is a circuit diagram of a free-running multivibrator. Q1 and Q2 are general-purpose PNP resistors, such as 2N3906 or 2N2907. R1 and R2 limit the current level supplied to the light sources, LED1 and LED2, respectively. The values of C1 and C2 control the flash rate of LED1 and LED2, respectively, with a larger capacitance resulting in a slower flash rate. It should be readily apparent to one skilled in the art that there are many other means to intermittently operate the light sources to produce an animation effect, and these modifications are intended to be within the spirit and scope of the invention as claimed.

Figure 30:
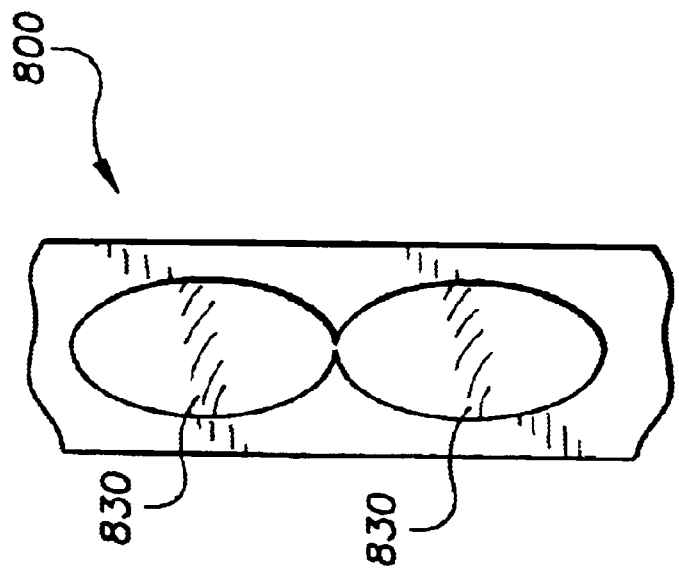
Figure 29:
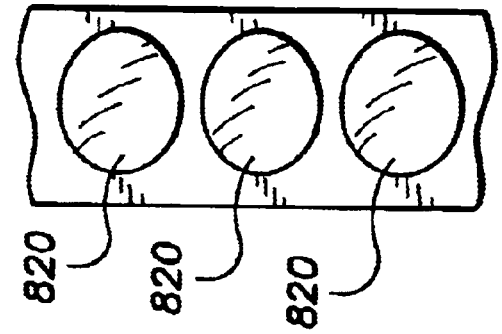
FIG. 29 is a fragmentary front view of a first embodiment of a beaded edge on a member; and, FIG. 30 is a fragmentary front view of a second embodiment of a beaded edge on a member.
Figure 28:
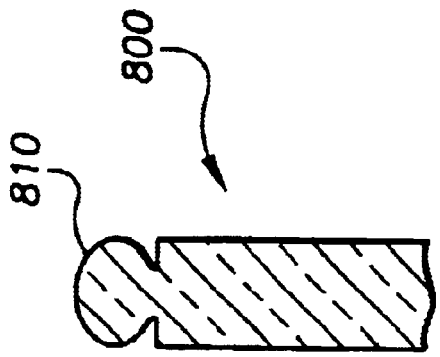
FIG. 28 is a fragmentary side cross sectional view of a beaded edge on a member.

In FIGS. 3–22, the members are shown with beveled edges. However, it should be readily apparent to one skilled in the art that textured edges can be used instead of beveled edges, and this modification is intended to be within the spirit and scope of the invention as claimed. For example, the edge may be formed in a beaded pattern around the perimeter of the member, as shown in FIGS. 28–30. FIG. 28 is a fragmentary side cross sectional view of a beaded edge 810 on member 800. FIGS. 29 and 30 are fragmentary front views of alternate embodiments of a beaded edge on a member. FIG. 29 shows substantially circular beads 820 on member 800, and FIG. 30 shows elongated beads 830 on member 800

In FIGS. 3–25, each member is shown with one light source. However, multiple light sources may be used and this modification is intended to be within the spirit and scope of the invention as claimed. Multiple light sources may be of different colors, and by turning them on independently the animation effect can be done in more than one color.

In a preferred embodiment, the members are made of acrylic, but other transparent or translucent materials can be used. Also in a preferred embodiment, the light sources are either light emitting diodes (LEDs) or grain of wheat bulbs.

Thus, it is seen that the objects of the present invention are efficiently obtained, although modifications and changes to the invention should be readily apparent to those having ordinary skill in the art, and these modifications are intended to be within the spirit and scope of the invention as claimed.

What we claim is:

1. An apparatus for producing an animation effect, comprising:
   a first light reflecting member, said first light reflecting member comprising a first surface and a second surface;
   a first light source, said first light source operatively arranged to emit light, said light from said first light source entering said first member through said first surface and exiting said first member through said second surface;
   a second light reflecting member, said second light reflecting member comprising a first surface and a second surface;
   a second light source, said second light source operatively arranged to emit light, said light from said second source entering said second member through said first surface and exiting said second member through said second surface; and,
   means to intermittently activate said first and second light sources to produce said animation effect, wherein said means to intermittently operate said light sources to produce said animation effect comprise an electronic control circuit connected to a power source of said light sources.

2. The apparatus recited in claim 1 wherein said first member further comprises a beveled edge operatively arranged to reflect said light after said light enters member through said first surface and before said light exits through said second surface.

3. The apparatus recited in claim 2 wherein said beveled edge of said first member forms an angle of approximately 45 degrees with said second surface.

4. The apparatus recited in claim 3 wherein said angle is substantially constant around a perimeter of said first member.

5. The apparatus recited in claim 1 wherein said second surface of said first member is textured.

6. The apparatus recited in claim 1 wherein said members comprise helical members which spiral around a central axis, said members operatively arranged to produce said animation effect of a drill bit turning.

7. The apparatus recited in claim 1 wherein said second member further comprises a beveled edge operatively arranged to reflect said light after said light enters member through said first surface and before said light exits through said second surface.

8. The apparatus recited in claim 7 wherein said beveled edge of said second member forms an angle of approximately 45 degrees with said second surface.

9. The apparatus recited in claim 8 wherein said angle is substantially constant around a perimeter of said second member.

10. The apparatus recited in claim 1 wherein said second surface of said second member is textured.

11. The apparatus recited in claim 1 wherein said members comprise an upper and a lower jaw, said members operatively arranged to produce said animation effect of a jaw moving.

12. The apparatus recited in claim 1 wherein said members are comprised of a transparent material.

13. The apparatus recited in claim 1 wherein said members are comprised of a translucent material.

14. The apparatus recited in claim 1 wherein said members are comprised of acrylic.

15. The apparatus recited in claim 1 wherein said first light source comprises a light emitting diode.

16. The apparatus recited in claim 1 wherein said second light source comprises a light emitting diode.

17. The apparatus recited in claim 1 wherein said first light source comprises a grain of wheat bulb.

18. The apparatus recited in claim 1 wherein said second light source comprises a grain of wheat bulb.

19. The apparatus recited in claim 1 wherein said members comprise wing shapes, said members operatively arranged to produce said animation effect of wings flapping.

20. The apparatus recited in claim 1 wherein said members are substantially parallel to one another.

21. The apparatus recited in claim 1 wherein said members comprise different sized triangles operatively arranged to form a warning sign.

22. The apparatus recited in claim 1 wherein said members comprise heart shapes, said members operatively arranged to produce said animation effect of a heart beating.

23. The apparatus recited in claim 1 wherein said members comprise members on an outer face of a smoke detector, said members operatively arranged to produce said animation effect when a battery in said smoke detector is substantially discharged.

24. An apparatus for producing an animation effect, comprising:
   a first light reflecting member, said first light reflecting member comprising a first surface and a second surface;
   a first light source, said first light source operatively arranged to emit light, said light from said first light source entering said first member through said first surface and exiting said first member through said second surface;
   a second light reflecting member, said second light reflecting member comprising a first surface and a second surface;
   a second light source, said second light source operatively arranged to emit light, said light from said second source entering said second member through said first surface and exiting said second member through said second surface; and,
   means to intermittently activate said first and second light sources to produce said animation effect;
   wherein said members comprise candle flame shapes, said members operatively arranged to produce said animation effect of a candle flame flickering.

25. An apparatus for producing an animation effect, comprising:
   a first light reflecting member, said first light reflecting member comprising a first surface and a second surface, wherein said second surface of said first member is beaded;
   a first light source, said first light source operatively arranged to emit light, said light from said first light source entering said first member through said first surface and exiting said first member through said second surface;
   a second light reflecting member, said second light reflecting member comprising a first surface and a second surface;

a second light source, said second light source operatively arranged to emit light, said light from said second source entering said second member through said first surface and exiting said second member through said second surface; and, means to intermittently activate said first and second light sources to produce said animation effect.

26. An apparatus for producing an animation effect, comprising:

a first light reflecting member, said first light reflecting member comprising a first surface and a second surface;

a first light source, said first light source operatively arranged to emit light, said light from said first light source entering said first member through said first surface and exiting said first member through said second surface;

a second light reflecting member, said second light reflecting member comprising a first surface and a second surface, wherein said second surface of said second member is beaded;

a second light source, said second light source operatively arranged to emit light, said light from said second source entering said second member through said first surface and exiting said second member through said second surface; and, means to intermittently activate said first and second light sources to produce said animation effect.

27. An apparatus for producing an animation effect, comprising:

a first light reflecting member, said first light reflecting member comprising a beveled edge operatively arranged to reflect light from a first light source;

a second light reflecting member, said second light reflecting member comprising a beveled edge operatively arranged to reflect light from a second light source; and, means to intermittently activate said first and second light sources to produce said animation effect;

wherein said members comprise candle flame shapes, said members operatively arranged to produce said animation effect of a candle flame flickering.

28. An apparatus for producing an animation effect, comprising:

a first light reflecting member, said first light reflecting member comprising a beveled edge operatively arranged to reflect light from a first light source;

a second light reflecting member, said second light reflecting member comprising a beveled edge operatively arranged to reflect light from a second light source; and, means to intermittently activate said first and second light sources to produce said animation effect, wherein said means to intermittently operate said light sources to produce said animation effect comprise an electronic control circuit connected to a power source of said light sources.

29. The apparatus recited in claim 28 wherein said members are comprised of a transparent material.

30. The apparatus recited in claim 28 wherein said members are comprised of a translucent material.

31. The apparatus recited in claim 28 wherein said members are comprised of acrylic.

32. The apparatus recited in claim 28 wherein said first light source comprises a light emitting diode.

33. The apparatus recited in claim 28 wherein said second light source comprises a light emitting diode.

34. The apparatus recited in claim 28 wherein said first light source comprises a grain of wheat bulb.

35. The apparatus recited in claim 28 wherein said second light source comprises a grain of wheat bulb.

36. The apparatus recited in claim 28 wherein said members comprise an upper and a lower jaw, said members operatively arranged to produce said animation effect of a jaw moving.

37. The apparatus recited in claim 28 wherein said members are substantially parallel to one another.

38. The apparatus recited in claim 28 wherein said members comprise different sized triangles operatively arranged to form a warning sign.

39. The apparatus recited in claim 28 wherein said members comprise heart shapes, said members operatively arranged to produce said animation effect of a heart beating.

40. The apparatus recited in claim 28 wherein said members comprise members on an outer face of a smoke detector, said members operatively arranged to produce said animation effect when a battery in said smoke detector is substantially discharged.

41. The apparatus recited in claim 28 wherein said members comprise wing shapes, said members operatively arranged to produce said animation effect of wings flapping.

42. A method for producing an animation effect comprising:

intermittently illuminating at least two members with at least one light source each, each of said members comprising a beveled edge operatively arranged to reflect light from said at least one light source each; and, controlling said intermittent illumination with an electronic control circuit connected to a power source of said light sources.

43. The method recited in claim 42 wherein said members are comprised of a transparent material.

44. The method recited in claim 42 wherein said members are comprised of a translucent material.

45. The method recited in claim 42 wherein said members are comprised of acrylic.

46. The method recited in claim 42 wherein at least one of said at least one light source each comprises a light emitting diode.

47. The method recited in claim 42 wherein at least one of said at least one of said at least one light source each comprises a grain of wheat bulb.

* * * * *